(12) United States Patent
Ikeda

(10) Patent No.: US 8,503,366 B2
(45) Date of Patent: Aug. 6, 2013

(54) RADIO COMMUNICATION SYSTEM, RADIO COMMUNICATION DEVICE, RADIO COMMUNICATION METHOD, AND PROGRAM

(75) Inventor: Tetsu Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 286 days.

(21) Appl. No.: 12/934,046

(22) PCT Filed: Mar. 30, 2009

(86) PCT No.: PCT/JP2009/056462
§ 371 (c)(1),
(2), (4) Date: Sep. 22, 2010

(87) PCT Pub. No.: WO2009/133742
PCT Pub. Date: Nov. 5, 2009

(65) Prior Publication Data
US 2011/0044255 A1   Feb. 24, 2011

(30) Foreign Application Priority Data

Apr. 30, 2008  (JP) .................. 2008-118841

(51) Int. Cl.
*H04W 4/00* (2009.01)
(52) U.S. Cl.
USPC ........................................ 370/328
(58) Field of Classification Search
USPC ............... 370/208, 210, 203, 286.328, 329, 370/330, 341, 335, 389, 392, 26, 261, 471
See application file for complete search history.

(56) References Cited

U.S. PATENT DOCUMENTS

| | | | | |
|---|---|---|---|---|
| 6,952,394 | B1* | 10/2005 | Kim et al. | 370/208 |
| 8,201,063 | B2* | 6/2012 | Ban | 714/790 |
| 2005/0107088 | A1 | 5/2005 | Oura | |
| 2005/0276337 | A1 | 12/2005 | Khan | |

FOREIGN PATENT DOCUMENTS

| | | |
|---|---|---|
| EP | 1718001 A2 | 11/2006 |
| JP | 2005110014 A | 4/2005 |
| JP | 2005150850 A | 6/2005 |
| JP | 2005303826 A | 10/2005 |
| JP | 2006222956 A | 8/2006 |
| JP | 2006304152 A | 11/2006 |
| TW | 200612703 A | 4/2006 |
| TW | 200718119 A | 5/2007 |
| WO | 2006064541 A | 6/2006 |
| WO | 2007069329 A | 6/2007 |
| WO | 2008038769 A | 4/2008 |

OTHER PUBLICATIONS

International Search Report for PCT/JP2009/056462 mailed Apr. 21, 2009.
Japanese Office Action for JP2010-510065 mailed on May 15, 2012.
Taiwanese Office Action for TW 098114159 dated on Apr. 10, 2013 with Partial English Translation.

* cited by examiner

*Primary Examiner* — Chi Pham
*Assistant Examiner* — Alexander O Boakye

(57) ABSTRACT

A radio communication system includes a plurality of radio communication devices that transmit and receive a subframe as a unit. Each of the plurality of radio communication devices adds a cyclic prefix to the head of the effective symbol of each OFDM symbol that makes up a subframe and adds a postfix to the tail of the effective symbol of the last OFDM symbol of the subframe.

12 Claims, 5 Drawing Sheets

RADIO COMMUNICATION SYSTEM, RADIO COMMUNICATION DEVICE, RADIO COMMUNICATION METHOD, AND PROGRAM

TECHNICAL FIELD

The present invention relates to a radio communication system, a radio communication device, a radio communication method, and a program.

BACKGROUND ART

In recent years, OFDM (Orthogonal Frequency Division Multiplexing) and OFDMA (Orthogonal Frequency Division Multiple Access) that allot data to a plurality of subcarriers in a radio communication system are receiving increasing attention. Of these, OFDMA has been adopted in, for example, WiMAX (Worldwide Interoperability for Microwave Access).

In OFDM and OFDMA, the transmission side converts a signal that contains data that is to be transmitted from a frequency domain to a time domain signal by means of an Inverse Fast Fourier Transform (IFFT) and then transmits the signal. On the reception side, the signal received from the transmission side is converted from a time domain to a frequency domain signal by means of a Fast Fourier Transform (FFT) and the original data is thus obtained.

To eliminate the influence of multipath interference in OFDM symbols, a cyclic prefix, which is a copy of the tail portion of an effective symbol that contains data that are to be transmitted, is typically added to the head of the effective symbol.

However, the optimum value of the cyclic prefix length depends on the propagation environment.

For example, the cyclic prefix length must be increased in a propagation environment having a large delay spread. However, increasing the cyclic prefix length results in a decrease of the amount of data that can be transmitted within a unit time and is therefore not suitable for a propagation environment in which a voluminous amount of data is to be transmitted at high speed.

Patent Documents 1 and 2 disclose techniques for making the cyclic prefix length of an OFDM symbol variable.

However, in a radio communication system in which the transmission and reception of data are carried out in frame units and in which the length of these frames is fixed, making the cyclic prefix length variable to construct frames from OFDM symbols may result in the occurrence of surplus time intervals that are less than the effective symbol length plus the cyclic prefix length. In this case, the surplus time does not allow the insertion of an OFDM symbol and therefore becomes idle time in which data cannot be transmitted.

In a radio communication system in which frames are divided into a plurality of subframes and the subframe length is fixed, idle time may occur in each subframe. Even in a radio communication system in which the subframe is variable, some subframes may be produced in which idle time occurs.

In OFDM and OFDMA in which the frame length is fixed, the shortening of idle time in frames/subframes and effective utilization of radio resources are crucial issues even when the cyclic prefix length is variable.

Patent Document 1: JP-A-2005-303826
Patent Document 2: JP-A-2005-110014

DISCLOSURE OF THE INVENTION

It is therefore an object of the present invention to provide a radio communication system, radio communication device, radio communication method, and program that can solve the above-described problems.

The radio communication system of the present invention includes a plurality of radio communication devices that transmit and receive a subframe as a unit, in which each of the radio communication devices include:
   a CP-addition unit that adds a cyclic prefix to the head of the effective symbol of each OFDM symbol that make up the subframe and adds a postfix to the tail of the effective symbol of the last OFDM symbol of the subframe.

The radio communication device of the present invention transmits and receives a subframe as a unit and includes:
   a CP-addition unit that adds a cyclic prefix to the head of the effective symbol of each OFDM symbol that makes up the subframe and adds a postfix to the tail of the effective symbol of the last OFDM symbol of the subframe.

The radio communication method of the present invention is realized by a radio communication device that transmits and receives a subframe as a unit and includes a CP-addition step of adding a cyclic prefix to the head of the effective symbol of each OFDM symbol that makes up the subframe and of adding a postfix to the tail of the effective symbol of the last OFDM symbol of the subframe.

The program of the present invention causes a radio communication device that transmits and receives a subframe as a unit to execute a CP-addition procedure of adding a cyclic prefix to the head of the effective symbol of each OFDM symbol that makes up the subframe and of adding a postfix to the tail of the effective symbol of the last OFDM symbol of the subframe.

According to the present invention, a radio communication device adds not only a cyclic prefix but also a postfix to the last symbol of a subframe on the transmission side. As a result, unnecessary idle time can be eliminated.

In addition, for the last symbol of a subframe on the reception side, the radio communication device removes the cyclic prefix and subjects the head portion of an effective symbol to an averaging process with the postfix and then removes the postfix. Here, the postfix is a copy of the head portion of the effective symbol, and as a result, implementing the above-described averaging process improves the SN ratio of the head portion of an effective symbol.

As a result, the present invention can obtain the effects of shortening idle time and effectively using the radio resources of this shortened idle time to improve reception characteristics.

BEST MODE FOR CARRYING OUT THE INVENTION

The best mode for carrying out the present invention is next explained with reference to the accompanying figures.

In the following exemplary embodiment, a case is described in which the radio communication system is a WiMAX radio communication system, but the present invention is not limited to this form.

Figure 1:
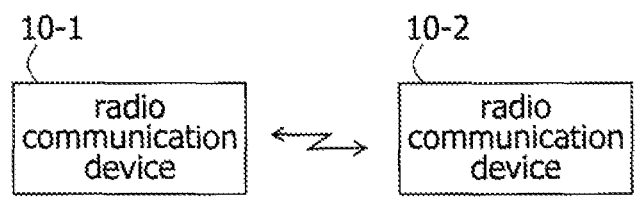
FIG. 1 is a block diagram showing the configuration of the radio communication system of the first exemplary embodiment of the present invention.

As shown in FIG. 1, the radio communication system of the present exemplary embodiment includes radio communication devices 10-1 and 10-2 that carry out transmission and reception in subframe units. In FIG. 1, the number of radio communication devices is set to two in the interest of simplifying the explanation, but the present invention is not limited to this form. One of radio communication devices 10-1 and 10-2 is a base station and the other is a terminal.

The configuration of radio communication devices 10-1 and 10-2 is described by dividing into a transmission side and a reception side.

The configuration of the transmission side of radio communication devices 10-1 and 10-2 is first described with reference to FIG. 2.

Figure 2:
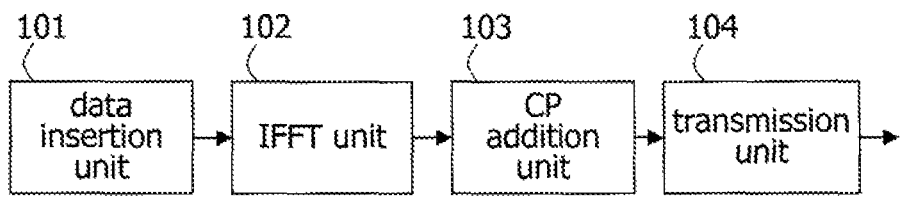
FIG. 2 is a block diagram showing an example of the configuration of the transmission side of the radio communication device shown in FIG. 1.

As shown in FIG. 2, data insertion unit 101, IFFT unit 102, CP (Cyclic Prefix/Postfix)-addition unit 103, and transmission unit 104 are provided on the transmission side of radio communication devices 10-1 and 10-2.

Data insertion unit 101 loads a pilot signal or data on a subcarrier to generate a signal of the frequency domain.

IFFT unit 102 converts the signal of the frequency domain that was generated in data insertion unit 101 to a time domain signal by means of an Inverse Fast-Fourier Transform to generate an effective symbol.

CP-addition unit 103 adds a cyclic prefix that is a copy of the tail portion of the effective symbol generated in IFFT unit 102 to the head of the effective symbol to generate one OFDM symbol.

At this time, CP-addition unit 103 not only adds a cyclic prefix to the last OFDM symbol of a subframe but can also add a postfix that is a copy of the head portion of the effective symbol to the tail of the effective symbol.

Figure 3:
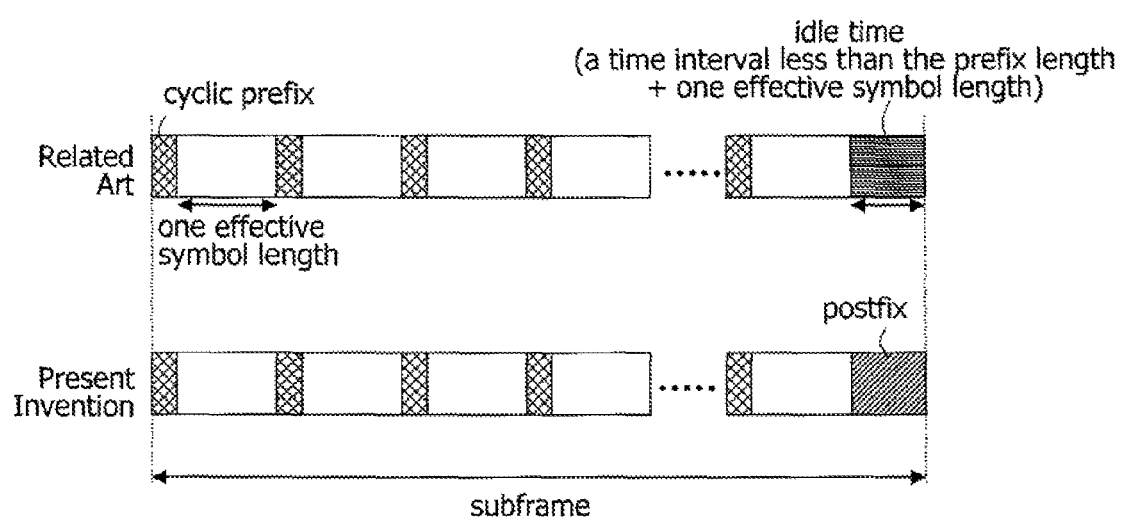
FIG. 3 shows an example of a subframe that is generated in the radio communication device shown in FIG. 1.

For example, when a surplus time interval that is less than the cyclic prefix length plus one effective symbol length remains in a subframe, as shown in FIG. 3, all of this time was rendered idle time in the related art.

In the present invention, in contrast, a postfix can be further added to the last OFDM symbol to circumvent the result in which all surplus time becomes idle time. This addition of a postfix to a time interval that amounts to less than the cyclic prefix length plus one effective symbol length allows a reduction of idle time.

Transmission unit 104 transmits to other radio communication devices a subframe made up from a plurality of OFDM symbols generated in CP-addition unit 103.

The configuration of the reception side of radio communication devices 10-1 and 10-2 is next described with reference to FIG. 4.

Figure 4:
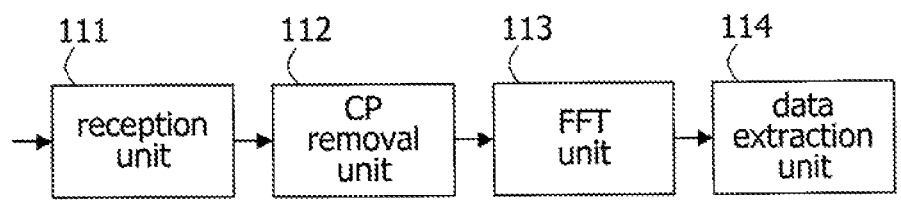
FIG. 4 is a block diagram showing an example of the configuration of the reception side of the radio communication device shown in FIG. 1.

As shown in FIG. 4, reception unit 111, CP-removal unit 112, FFT unit 113, and data extraction unit 114 are provided on the reception side of radio communication devices 10-1 and 10-2.

Reception unit 111 receives a subframe from another radio communication device.

CP-removal unit 112 removes the cyclic prefix from each of the plurality of OFDM symbols that make up the subframe that was received in reception unit 111 to obtain effective symbols.

At this time, when a postfix has been added to the last OFDM symbol of the subframe, CP-removal unit 112, after removing the cyclic prefix, both subjects the head portion of the effective symbol to an averaging process with the postfix and then removes the postfix. The averaging process in this case is a process of averaging the amplitude after superposing the postfix in the head portion of the effective symbol.

The postfix is a copy of the head portion of the effective symbol on the transmission side, and the implementation of the above-described averaging process therefore improves the SN ratio (Signal to Noise ratio) of the head portion of the effective symbol.

FFT unit 113 converts the effective symbols obtained by CP-removal unit 112 from a signal of the time domain to a signal of the frequency domain by means of a fast-Fourier transform.

Data extraction unit 114 extracts the pilot signal and data that are loaded on the subcarrier of the signal of the frequency domain that has been subjected to the fast-Fourier transform in FFT unit 113.

The operations of radio communication devices 10-1 and 10-2 are next described divided between the transmission operation and reception operation. In the following explanation, radio communication device 10-1 is assumed to be the transmission side and radio communication device 10-2 is assumed to be the reception side. In addition, a postfix is assumed to be added to the last OFDM symbol of a subframe, and explanation focuses on the operation of processing the last OFDM symbol.

The transmission operation of radio communication device 10-1 is first described with reference to FIG. 5.

When transmitting a subframe to radio communication device 10-2, the OFDM symbols that make up the subframe are sequentially generated in radio communication device 10-1. When a postfix is added to the last OFDM symbol, the following process is carried out.

Figure 5:
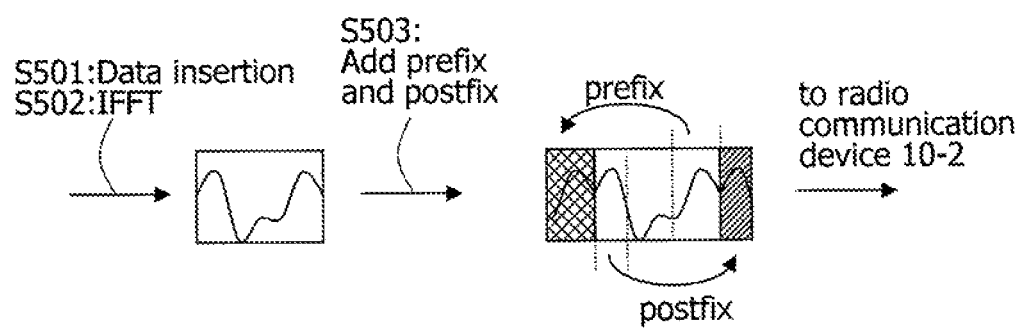
FIG. 5 is a flow chart for explaining an example of the transmission operations of the radio communication device shown in FIG. 1.

As shown in FIG. 5, data insertion unit 101 first generates a signal of the frequency domain in which a pilot signal or data is loaded in a subcarrier in Step S501, and in Step S502, IFFT unit 102 converts the signal of the frequency domain to a signal of the time domain by means of an inverse fast-Fourier transform to generate effective symbols.

In Step S503, CP-addition unit 103 next both adds a cyclic prefix that is a copy of the tail portion of the effective symbol to the head of the effective symbol and adds a postfix that is a copy of the head portion of the effective symbol to the tail of the effective symbol.

In this way, a subframe in which a postfix has been added to the last OFDM symbol can be generated in radio communication device 10-1. This subframe is subsequently transmitted to radio communication device 10-2 by transmission unit 104.

The reception operation of radio communication device 10-2 is next described with reference to FIG. 6.

When a subframe is received from radio communication device 10-1 in radio communication device 10-2, the data is sequentially extracted from the OFDM symbols that make up the subframe. When a postfix has been added to the last OFDM symbol, the following process is carried out.

Figure 6:
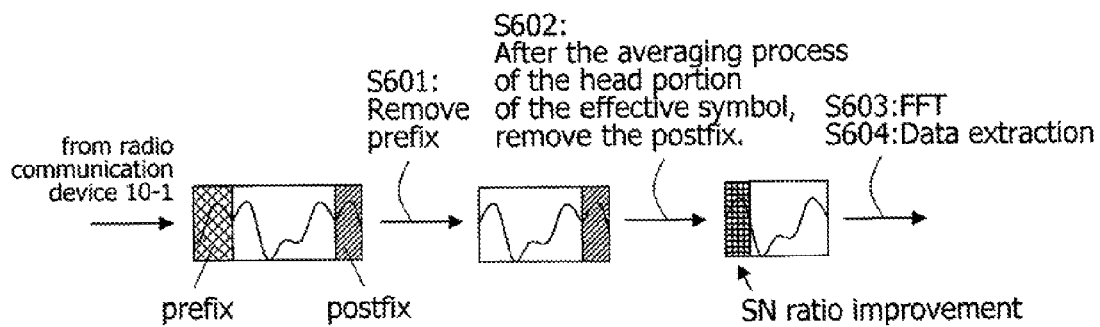
FIG. 6 is a flow chart for explaining an example of the reception operation of the radio communication device shown in FIG. 1.

As shown in FIG. 6, in radio communication device 10-2, CP-removal unit 112 first removes the cyclic prefix from the OFDM symbol in Step S601.

CP-removal unit 112 next subjects the head portion of the effective symbol to an averaging process with the postfix and then removes the postfix.

FFT unit 113 then converts the effective symbol from a signal of the time domain to a signal of the frequency domain by means of a fast-Fourier transform in Step S603, and data extraction unit 114 extracts the pilot signal or data loaded in the subcarrier in Step S604.

In this way, the SN ratio of the last OFDM symbol can be improved in radio communication device 10-2.

In the present exemplary embodiment as described above, radio communication devices 10-1 and 10-2 are able to add not only a cyclic prefix but also a postfix to the last OFDM symbol of a subframe on the transmission side. As a result, unwanted idle time can be eliminated.

On the reception side, when a postfix has been added to the last OFDM symbol of a subframe, radio communication devices 10-1 and 10-2 remove the cyclic prefix, subject the head portion of the effective symbol to an averaging process with the postfix and then remove the postfix. As a result, the SN ratio of the head portion of the effective symbol is improved.

Accordingly, the idle time can be shortened and the radio resources of this shortened idle time can be effectively utilized to improve the reception characteristics.

Although it has been assumed in the present exemplary embodiment that the effective symbol lengths in a subframe are all identical, in the interest of increasing data that is transmitted, an OFDM symbol in which the effective symbol length is 1/X (where X is an integer equal to or greater than 2) may also be inserted in the idle time and a postfix added to this OFDM symbol.

Figure 7:
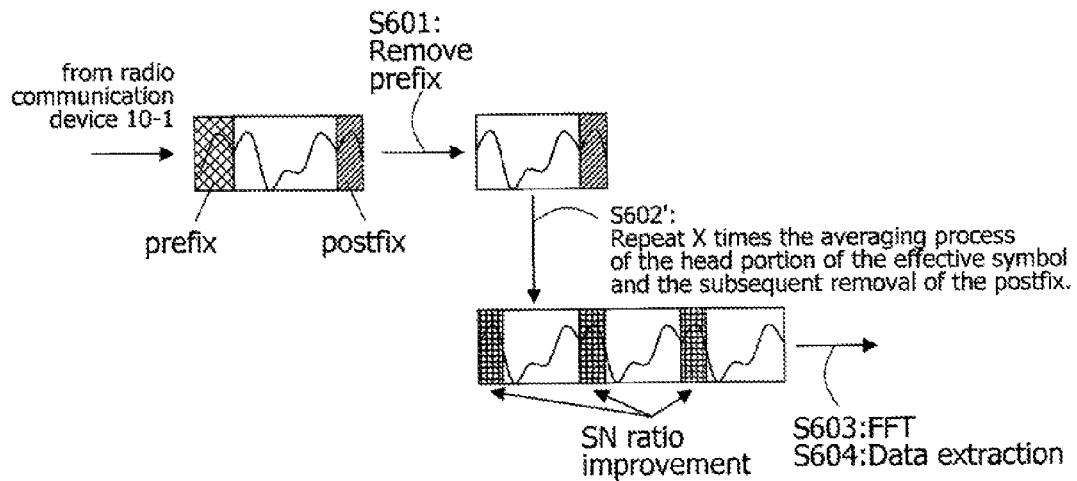
FIG. 7 is a flow chart for explaining another example of the reception operation of the radio communication device shown in FIG. 1.

When the effective symbol length of the last OFDM symbol of a subframe received from radio communication device 10-1 is 1/X, radio communication device 10-2 may carry out the reception operation shown in FIG. 7. FIG. 7 is a case in which Step S602 of FIG. 6 is altered to Step S602'. In this case, the data extracted in Step S604 are loaded only on the nX (where n is 1, 2, 3, . . . )$^{th}$ subcarrier.

As shown in FIG. 7, in Step S602', CP-removal unit 112 repeats X times the symbol in which the head portion of effective symbols is subjected an averaging process with the postfix and in which the postfix is then removed. The period in this case is 1/X period of one effective symbol length.

Although it was assumed in the present exemplary embodiment that the cyclic prefix lengths in a subframe are all identical, the cyclic prefix lengths in a subframe may differ.

However, variation of the cyclic prefix lengths for each OFDM symbol results in an increase in the amount of information of the control signal that indicates the cyclic prefix lengths that are transmitted from the transmission side to the reception side and a consequent increase of radio resources that are consumed.

Figure 8:
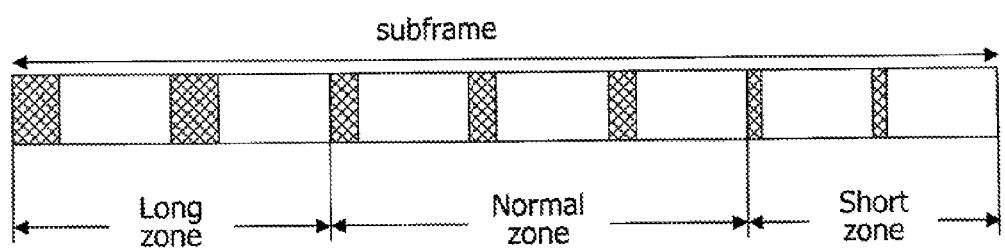
FIG. 8 shows another example of a subframe that is generated in the radio communication device shown in FIG. 1.

When the cyclic prefix lengths are varied in a subframe in the present exemplary embodiment, CP-addition unit 103 divides the subframe into a plurality of zones as shown in FIG. 8 and defines the cyclic prefix length for each zone and uses the same cyclic prefix length in same zones. In the example of FIG. 8, the subframe is classified into three zones, a Long zone, a Normal zone, and a Short zone, in which the cyclic prefix lengths are set to "long," "normal," and "short," respectively, an identical cyclic prefix length being used in each zone. These zones may also be defined as new subframes.

The amount of information that is contained in the control signal that indicates the cyclic prefix lengths can therefore be reduced, enabling a limitation of the consumption of radio resources.

The method carried out in radio communication devices 10-1 and 10-2 of the present invention may be applied to a program for execution by a computer. In addition, this program can be stored in a storage medium and can be provided to the outside by way of a network.

Although the present invention has been described hereinabove with reference to an exemplary embodiment, the present invention is not limited to the above-described exemplary embodiment. The configuration and details of the present invention are open to various modifications within the scope of the present invention that will be understood by one of ordinary skill in the art.

The present application is the National Phase of PCT/JP2009/056462, filed Mar. 30, 2009, which claims priority based on Japanese Patent Application No. 2008-118841 for which application was submitted on Apr. 30, 2008 and incorporates all of the disclosures of that application.

What is claimed is:

1. A radio communication system that includes a plurality of radio communication devices that transmit and receive a subframe as a unit, wherein each of said radio communication devices comprises:
    a CP-addition unit that adds a cyclic prefix to the heads of effective symbols of each of the OFDM symbols that make up said subframe and adds a postfix to the tail of the effective symbol of the last OFDM symbol of said subframe; and
    a CP-removal unit that removes cyclic prefixes from each of the OFDM symbols that make up said subframe received from another radio communication device, and for the last OFDM symbol of said subframe, subjects the head portion of the effective symbol to an averaging process with a postfix and then removes the postfix.

2. The radio communication system as set forth in claim 1, wherein, when the effective symbol length of the last OFDM symbol of said subframe is 1/X (where X is an integer equal to or greater than 2), said CP-removal unit, for the last OFDM symbol, repeats X times the symbol in which the head portion of the effective symbol is subjected an averaging process with a postfix and in which the postfix is then removed.

3. The radio communication system as set forth in claim 1, wherein said CP-addition unit divides said subframe into a plurality of zones, defines a cyclic prefix length for each zone, and uses the identical cyclic prefix length in the same zones.

4. The radio communication system as set forth in claim 1, wherein said CP-addition unit defines a cyclic prefix length for each subframe and then uses the same cyclic prefix length in the same subframes.

5. A radio communication device that carries out transmission and reception of a subframe as a unit, comprising:
    a CP-addition unit that adds a cyclic prefix to the head of the effective symbol of each of the OFDM symbols that make up said subframe, and adds a postfix to the tail of the effective symbol of the last OFDM symbol of said subframe; and
    a CP-removal unit that removes the cyclic prefix from each OFDM symbol that makes up said subframe received from another radio communication device, and for the last OFDM symbol of said subframe, subjects the head portion of the effective symbol to an averaging process with a postfix and then removes the postfix.

6. The radio communication device as set forth in claim 5, wherein said CP-removal unit, when the effective symbol length of the last OFDM symbol of said subframe is 1/X (where X is an integer equal to or greater than 2), for the last OFDM symbol, repeats X times the symbol in which the head portion of the effective symbol is subjected an averaging process with a postfix and in which the postfix is then removed.

7. The radio communication device as set forth in claim 5; wherein said CP-addition unit divides said subframe into a plurality of zones, defines a cyclic prefix length for each zone, and uses the same cyclic prefix length in the same zones.

8. The radio communication device as set forth in claim 5, wherein said CP-addition unit defines a cyclic prefix length for each subframe and uses the same cyclic prefix length in the same subframes.

9. A radio communication method realized by a radio communication device that transmits and receives a subframe as a unit, said radio communication method comprising:
  a CP-addition step of adding a cyclic prefix to the head of the effective symbol of each OFDM symbol that makes up said subframe and of adding a postfix to the tail of the effective symbol of the last OFDM symbol of said subframe; and
  a CP-removal step of removing the cyclic prefix from each OFDM symbol that makes up said subframe that is received from another radio communication device, and for the last OFDM symbol of said subframe, subjecting the head portion of the effective symbol to an averaging process with a postfix and then removing the postfix.

10. The radio communication method as set forth in claim 9, wherein, in said CP-removal step, when the effective symbol length of the last OFDM symbol of said subframe is 1/X (where X is an integer equal to or greater than 2), for the last OFDM symbol, the symbol, in which the head portion of the effective symbol is subjected an averaging process with a postfix and in which the postfix is then removed, is repeated X times.

11. The radio communication method as set forth in claim 9, wherein, in said CP-addition step, said subframe is divided into a plurality of zones, a cyclic prefix length is defined for each zone, and the same cyclic prefix length is used in the same zones.

12. The radio communication method as set forth in claim 9, wherein said CP-addition step defines a cyclic prefix length for each subframe and uses the same cyclic prefix length in the same subframes.

* * * * *